July 21, 1953
E. T. BECKMAN
2,645,948
AUXILIARY ACCELERATOR LEFT FOOT
PEDAL FOR POWER-DRIVEN VEHICLES
Filed Dec. 12, 1949
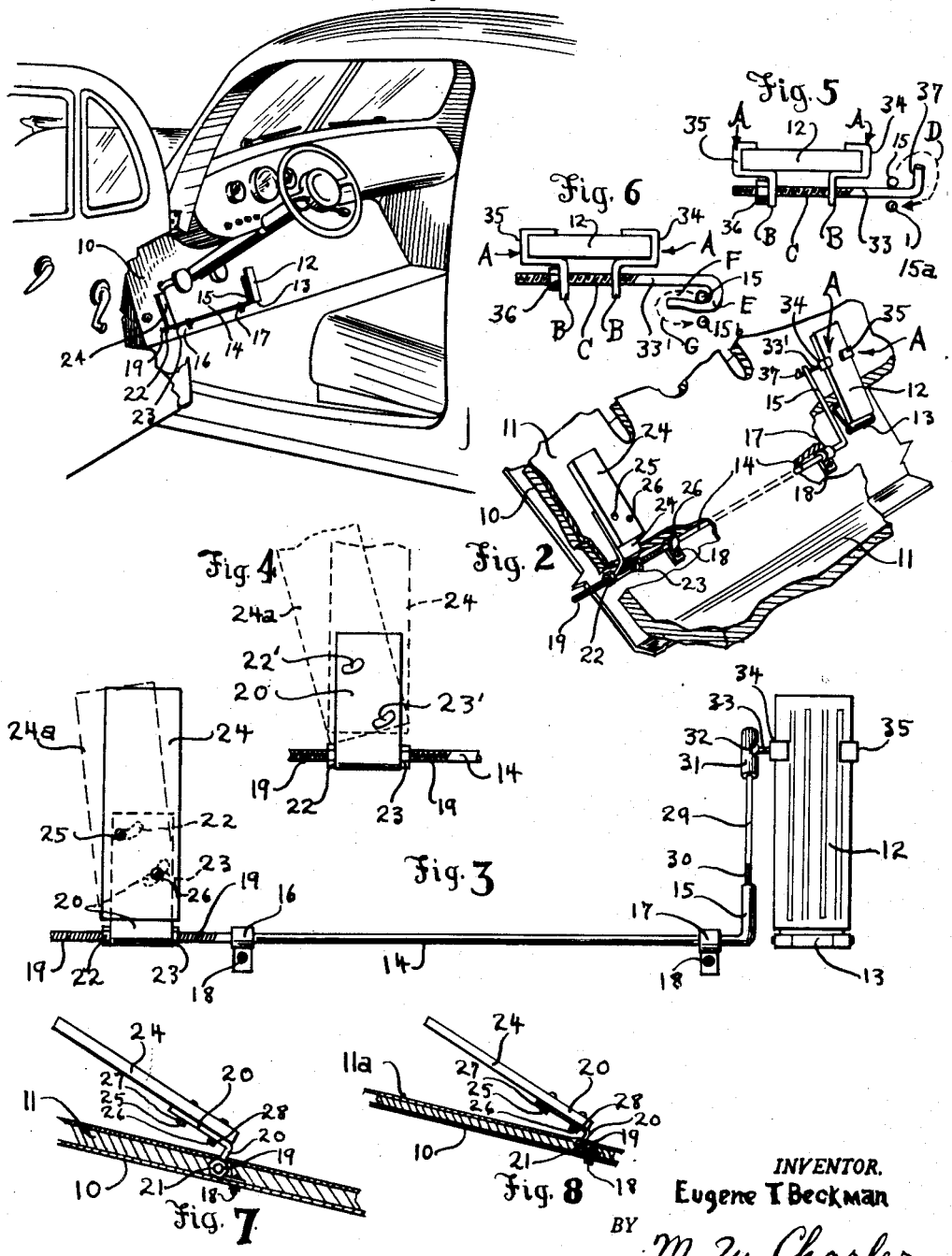
INVENTOR.
Eugene T Beckman
BY
M. Y. Charles
Attorney Patented July 21, 1953

2,645,948

UNITED STATES PATENT OFFICE 2,645,948

AUXILIARY ACCELERATOR LEFT FOOT PEDAL FOR POWER-DRIVEN VEHICLES

Eugene T. Beckman, Fowler, Kans.

Application December 12, 1949, Serial No. 132,562

3 Claims. (Cl. 74—562.5)

My invention relates to an improvement in auxiliary accelerator foot pedal for vehicles. An object of my invention is to provide a device of the kind mentioned that may be installed in an automobile either as regular equipment or as an accessory.

A further object of the invention is to provide a device of the kind mentioned that will provide means for accelerating the speed of the vehicle engine with either foot of the operator of the vehicle.

A still further object of the invention is to provide a device of the kind mentioned in which the linkage between the two foot accelerator pedals may be easily and quickly attachable and detachable for connecting or disconnecting one pedal to or from the other, the device being made so that this operation may be done without the use of tools.

A still further object of the invention is to provide a device of the kind mentioned that is simple to make, one that is inexpensive, one that is easy to install, and one that is sturdy, long lived, efficient in its work as well as being easy and simple to use. These and other objects will be more fully described as this description progresses.

Now referring to the accompanying drawings in which similar numerals of reference designate the same parts throughout the several figures of the drawings;

Fig. 1 is a perspective view of the front portion of an automobile body, the front door being shown in an open position and a part thereof being broken away to show the auxiliary accelerator foot pedal device as it appears in an automobile.

Fig. 2 is an enlarged detail perspective view of the auxiliary foot pedal device, and showing a portion of the automobile floor, attachment of the device to the floor and showing the floor mat over which the accelerator pedals work.

Fig. 3 is an enlarged detail top plan view of the auxiliary foot pedal device and its attachment to the primary or original accelerator foot pedal.

Fig. 4 is a top plan view of the auxiliary foot pedal support.

Fig. 5 is an upper end view of the primary accelerator pedal and illustrating one method of connection between the primary pedal and the auxiliary pedal.

Fig. 6 is a view the same as in Fig. 5 and showing a modified form of connection between the primary pedal and the auxiliary pedal.

Fig. 7 is a detail side view of the auxiliary foot pedal and illustrating the design of mounting thereof where a thick floor pad is used.

Fig. 8 is a detail side view of the auxiliary foot pedal and illustrating the design of mounting thereof where a thin floor pad is used.

In the drawings is shown the usual sloping floor element 10 of an automobile, the floor board 10 is covered with a thick floor pad 11 as shown in Fig. 7, or a thin floor pad 11a as shown in Fig. 8. The usual or primary accelerator pedal is shown at 12 and is hingedly mounted at 13 to the floor board 10 in the usual manner.

My improved auxiliary accelerator pedal and connection device therefor to the primary accelerator foot pedal consists of a shaft 14, one end of which is bent at a ninety degree angle to the shaft 14 to form a rockable lever element 15. The shaft 14 is revolvably carried in suitable bearing elements 16 and 17 that are rigidly attached to the floor element 10 of the vehicle body by means of suitable screws, bolts or the like 18 to preferably hold the center axis of the shaft 14 in alignment with the center axis of the original or primary accelerator foot pedal supporting hinge 13. The other end of the shaft 14 is threaded as indicated at 19.

The device is provided with an auxiliary accelerator foot pedal support element 20. One end of the auxiliary accelerator foot pedal support 20 has a hole 21 therethrough through which the threaded end 19 of the shaft 14 slidably passes and nuts 22 and 23 that are threaded on the threaded end 19 of the shaft 14 are turned each to bear one on one side of the auxiliary foot pedal support 20 and the other to bear against the other side of the auxiliary foot pedal support 20 to rigidly bind and hold the auxiliary foot pedal support element 20 in adjusted radial positions about the threaded end 19 of the shaft 14 for the purposes that will later be made obvious. The auxiliary foot pedal accelerator support 20 is preferably made L-shaped to allow for the thickness of the floor pad 11 through which the auxiliary accelerator foot pedal support will have to operate. The auxiliary pedal support plate 20 is provided with a pair of spaced apart curved slots 22' and 23' for purposes that will later be described.

An auxiliary accelerator foot pedal 24 is positioned over and rests on the auxiliary accelerator foot pedal support 20 and bolts 25 and 26 are slidably passed through the lower end thereof and also through the slots 22' and 23' and nuts 27 and 28 are threaded on the bolts 25 and 26 to rigidly bind and hold the auxiliary accelerator foot pedal 24 on the auxiliary accelerator foot pedal support element 20 in adjusted angular positions such as indicated by the dotted position 24a. This is a feature of importance since the angle of the auxiliary accelerator foot pedal 24 may be adjusted to the angle the driver's foot will normally take in using the auxiliary accelerator foot pedal and this makes for more comfort and accuracy in using the auxiliary accelerator foot pedal.

As shown in Fig. 3 the lever portion 15 of the shaft 14 is provided with an extension shaft 29, one end of which is threaded as at 30 and is threadedly screwed into a threaded hole in the end of the lever element 15. The extent to which the end 30 of the extension shaft 29 is screwed into the lever element 15 serves as a means of adjusting the length of the lever assembly 15—29. Rigidly fixed on the outer end of the lever extension 29 is a ball seat element 31 in which is seated a ball 32 that is rigidly carried on a pin element 33 that is rigidly carried by a pair of clamp elements 34 and 35 that are rigidly clamped onto the upper end portion of the primary accelerator pedal 12 so that when the auxiliary accelerator foot pedal 24 is pressed to rock downwardly the shaft 14 and lever 15—29—31 will be actuated to likewise rock the primary accelerator foot pedal 12 downwardly to govern the speed of the vehicle in the usual manner. While the primary accelerator foot pedal 12 may be operated from the auxiliary accelerator foot pedal 12 as above described it is obvious that the primary accelerator foot pedal 12 may also be operated in the usual manner by the right foot of the operator of the vehicle.

In Figures 2 and 5 is shown a modified form of the linkage between the lever 15 and the primary accelerator foot pedal 12. In these figures is shown the clamp elements 34 and 35 which are identical to those shown in Figures 2, 3, 5 and 6. The clamp elements 34 and 35 each consist of a hook-like formation A having a depending leg B and a threaded portion C of a pin 33', which is the same as the pin 33 in Fig. 3 and is threaded through the leg B of the clamp member 34 and slidably passes through the leg B of the clamp member 35, and a nut 36 is threaded on the threaded end of the pin 33' to bear against the leg B of the clamp member 35 to draw the two clamp members 34 and 35 toward each other and thereby tightly and rigidly hold them and the pin 33 or 33' on the primary accelerator foot pedal 12.

As shown in Figures 2 and 5, one end of the pin 33' extends inwardly and beyond the primary accelerator foot pedal 12 and is turned upwardly as at 37 and the lever 15 is made long enough to rest on the pin 33' thereby omitting the parts 29, 31 and 32 as shown in Fig. 3. If it is desired to disconnect the auxiliary accelerator foot pedal device from the primary accelerator foot pedal this may be done by taking hold of the upper or outer end of the lever 15, raising it and then springing and moving it in the direction of the dotted line and arrow D to the position 15a whereupon the auxiliary accelerator foot pedal 24 will drop to the floor 10—11 and the lever arm 15 will do likewise.

The modification shown in Fig. 6 is the same as that shown in Figures 2 and 5 except that one end of the pin 33' is bent in a hook shape E with the opening F of the hook being directed toward the primary accelerator foot pedal 12 and the direction of the hand of the hook E being downward from the primary accelerator foot pedal 12. The opening F of the hook E is slightly narrower than the diameter of the lever 15 that is resting in the hook E to insure the retention of the end of the lever 15 in the hook E.

To disconnect the auxiliary accelerator foot pedal device from the primary accelerator foot pedal the end of the lever 15 may be moved in the direction of the dotted line and arrow G and forced through the hook opening F and to the position 15b whereupon the auxiliary accelerator foot pedal will drop to the floor 10—11 and the lever 15 will do likewise whereupon the primary accelerator foot pedal may be used in the usual manner without the auxiliary accelerator pedal.

To be able to use the auxiliary accelerator pedal device on all automobiles it may be necessary to vary the spacing between the primary accelerator foot pedal and the auxiliary accelerator foot pedal in order to make the device fit the vehicle in which the device is to be used, or to fit the person that is to use the device. This adjustment may be made by screwing the nuts 22 and 23 away from the auxiliary accelerator foot pedal support 20 and then sliding the auxiliary accelerator pedal support 20 to the selected position and then rescrewing the nuts 22 and 23 to engagement with the element 20 to rigidly refix the support 20 on the shaft 14 in its radially adjusted position as hereinbefore described.

After the auxiliary accelerator foot pedal device has been installed as above described the floor pad 11 is cut to provide for the passage of the auxiliary accelerator foot pedal therethrough and then replaced over the floor element 10 and over the shaft 14 whereby, the device, except for the auxiliary accelerator foot pedal and the lever 15 or 15—29, is concealed from view.

While the device as shown and described is probably the preferred form of the device it is to be understood that such modifications of the device may be employed as lie within the scope of the appended claims without departing from the spirit and intention of the invention. Now having fully shown and described my invention what I claim is:

1. In an auxiliary left foot accelerator pedal device of the kind described for power driven vehicles; said device comprising the combination of a shaft having a lever integrally formed on one end thereof and positioned substantially ninety degrees to the shaft, and bearing means, said bearing means being rigidly attachable to the floor of a vehicle and revolvably holding the said shaft in close proximity to the floor of the vehicle, the other end of said shaft being threaded, a foot pedal support element and a foot pedal angularly adjustably carried thereon, one end of the foot pedal support element being receivable over the threads on the said shaft, said threaded end of the said shaft having a pair of spaced apart nuts threaded thereon and positioned one on and engaging either side of the foot pedal element in selected positions along the threaded portion of the shaft as a means of holding the pedal support element in adjusted position toward and away from the lever element on the shaft and also in radial adjustment about the longitudinal center axis of the said shaft, a pair of foot pedal clamp elements, said clamp elements being fittable against opposite side edges of an accelerator foot pedal of the vehicle and each clamp element having depending ear elements thereon that are spaced each from the other and being in parallelism each with the other, a clamp shaft, the major portion and associated end of said clamp shaft being threaded, the threaded portion of the clampshaft being threadedly received in and passing through a threaded opening in the ear of one of the clamp elements and slidably passing through a hole in the ear of the second of said clamp elements, said threaded portion of the clamp shaft having a nut threaded thereon to bear against the ear of the second said clamp element to draw the two clamp elements toward each other for the purpose of binding the two clamp elements on the accelerator pedal, said threaded portion of the clamp shaft also serving as a longitudinal adjustment of the clamp shaft, the other end of said clamp shaft having means thereon for receiving the swingable end of the said lever for the simultaneous operation of the accelerator pedal with movements of the left foot pedal on the threaded end of the first said shaft.

2. In an auxiliary left foot accelerator pedal device of the kind described for power driven vehicles, the combination of structure and arrangement thereof as defined in claim 1, said combination being further characterized by the auxiliary pedal support element having a leg thereon that is positioned intermediate the mounting portion of the pedal support element on the first said shaft and the balance of the pedal support the length of said leg being slightly more than the thickness of the vehicle floor covering that would lay over the shaft and through which the said leg would rockably pass.

3. In an auxiliary left foot accelerator pedal device of the kind described for power driven vehicles, the combination of structure and arrangement thereof as defined in claim 1, said combination being further characterized by the auxiliary pedal support element having a leg thereon that is positioned intermediate the mounting portion of the pedal support element on the first said shaft and the balance of the pedal support the length of said leg being slightly more than the thickness of the vehicle floor covering that would lay over the shaft and through which the said leg would rockably pass said auxiliary accelerator foot pedal being rigidly attached to the swingable end portion of the pedal support element by a pair of bolts slidably passed through holes in the accelerator foot pedal and the supporting element therefore, said holes being a pair of spaced apart curved slots to permit the aforementioned angular adjustment of the auxiliary foot pedal on its support therefor.

EUGENE T. BECKMAN.

References Cited in the file of this patent

UNITED STATES PATENTS

| Number | Name | Date |
|---|---|---|
| 1,481,753 | Spiro | Jan. 22, 1924 |
| 1,857,448 | Frazier | May 10, 1932 |
| 1,889,685 | McIntyre | Nov. 29, 1932 |
| 2,181,883 | Gibson | Dec. 5, 1939 |
| 2,202,126 | Tercero | May 28, 1940 |
| 2,253,850 | Fisher | Aug. 26, 1941 |
| 2,312,031 | Contcher | Feb. 23, 1943 |
| 2,430,561 | Fletcher | Nov. 11, 1947 |
| 2,507,009 | Haushalter | May 9, 1950 |
| 2,524,486 | Snow | Oct. 3, 1950 |